(12) United States Patent
Brown et al.

(10) Patent No.: US 12,013,549 B2
(45) Date of Patent: Jun. 18, 2024

(54) ASYMMETRIC SMA ACTUATOR

(71) Applicant: CAMBRIDGE MECHATRONICS LIMITED, Cambridge (GB)

(72) Inventors: Andrew Benjamin Simpson Brown, Cambridge (GB); Daniel John Burbridge, Cambridge (GB); Samuel Armstrong, Cambridge (GB); Robert Langhorne, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 816 days.

(21) Appl. No.: 16/968,827

(22) PCT Filed: Feb. 25, 2019

(86) PCT No.: PCT/GB2019/050502
§ 371 (c)(1),
(2) Date: Aug. 10, 2020

(87) PCT Pub. No.: WO2019/162694
PCT Pub. Date: Aug. 29, 2019

(65) Prior Publication Data
US 2021/0003119 A1     Jan. 7, 2021

(30) Foreign Application Priority Data

Feb. 23, 2018   (GB) ...................................... 1802930

(51) Int. Cl.
*G02B 27/64*     (2006.01)
*G02B 6/38*      (2006.01)
(Continued)

(52) U.S. Cl.
CPC ......... *G02B 27/646* (2013.01); *G02B 6/3859* (2013.01); *G02B 7/005* (2013.01);
(Continued)

(58) Field of Classification Search
CPC .... F03G 7/065; F03G 7/0665; F03G 7/06143; G02B 6/3859; G02B 7/005;
(Continued)

(56) References Cited

U.S. PATENT DOCUMENTS

2015/0135703 A1*   5/2015   Eddington .............. F03G 7/065
                                                              60/528

FOREIGN PATENT DOCUMENTS

CN       102770804 A     11/2012
CN       104335101 A      2/2015
(Continued)

OTHER PUBLICATIONS

International Search Report and Written Opinion received for PCT Patent Application No. PCT/GB2019/050502, dated May 29, 2019, 11 pages.
(Continued)

*Primary Examiner* — Yogesh K Aggarwal
(74) *Attorney, Agent, or Firm* — Haley Guiliano LLP

(57) ABSTRACT

An SMA actuator (10) comprising SMA wires (31, 32) in which the wire arrangement is asymmetrical, allowing a greater range of motion from a rest position in a first direction than in a second direction, which may be opposite or orthogonal to the first direction. Where the directions are opposite, the angle between a principal axis and the wires providing motion in the first direction may be different from the angle between the principal axis and the wires providing motion in the second direction.

17 Claims, 2 Drawing Sheets

(51) Int. Cl.
  *G02B 7/00* (2021.01)
  *G03B 3/10* (2021.01)
  *H04N 23/55* (2023.01)
(52) U.S. Cl.
  CPC ............ *G03B 3/10* (2013.01); *G03B 2205/00* (2013.01); *G03B 2205/0076* (2013.01); *H04N 23/55* (2023.01)
(58) Field of Classification Search
  CPC .......... G02B 27/646; G02B 7/04; G03B 3/10; G03B 2205/00; G03B 2205/0076; H04N 23/55
  See application file for complete search history.

(56) References Cited

FOREIGN PATENT DOCUMENTS

| | | |
|---|---|---|
| CN | 104982028 A | 10/2015 |
| CN | 105164412 A | 12/2015 |
| DE | 10 2012 002119 | 7/2013 |
| JP | 2001025582 A | 1/2001 |
| WO | WO 2013175197 | 11/2013 |
| WO | WO 2014076463 | 5/2014 |

OTHER PUBLICATIONS

Office Action of Chinese Application No. 201980013038.3 dated Jun. 30, 2022.

* cited by examiner

ASYMMETRIC SMA ACTUATOR

CROSS-REFERENCE TO RELATED APPLICATIONS

This application is a national stage application under 35 U.S.C. § 371 of International Application PCT/GB2019/050502, filed Feb. 25, 2019, which claims priority of GB Patent Application 1802930.6 filed Feb. 23, 2018. The disclosure of which are hereby incorporated by reference herein in their entireties.

The present techniques generally concern an SMA actuator, for example for 3-dimensional movement, and particularly, but not exclusively, an SMA actuator in which the ranges of movement are asymmetric.

An example of an SMA actuator comprising eight SMA wires is disclosed in the co-owned international patent publication WO2011/104518. Each of the eight wires is connected between a static part (the support) and a moving part. When heated above its transition temperature, SMA transforms from its low temperature form, martensite, to its higher temperature form, austenite (and vice versa on cooling). The transformation on heating causes the SMA wire to contract, providing motive force to the moving part. On cooling, the wire can be readily extended to its original length by application of an opposing force, which in the case of the eight wire actuator is provided by opposing wires. In the eight wire actuator, the wires are individually heated to generate movement of the moving part to desired positions in three dimensions.

Each wire can only shrink or extend by a limited amount. This means that the translational movement that can be achieved by the moving portion is restricted to a shape that approximates to an octahedron where each face of the octahedron is normal to a corresponding wire and is determined by the limit of that wire to shrink or to extend. The centre of the motion can be defined as the position of the moving portion where all the wires have the same strain, or if this state cannot be achieved, the position where four of the wires have one strain and four of the wires have a second strain where strain is measured relative to a fully austenitic or fully martensitic length.

In many applications the complete possible range of motion of the actuator (the octahedron described above) may not be required or regions of the possible range of motion may be used more frequently or may be more important than other regions.

Whilst the problems above have been exemplified in relation to an actuator with eight wires, similar problems exist in actuators with other arrangements of wires.

SMA materials have the property that the transformation temperature is affected by the tension in the wire, higher tensions causing higher transformation temperatures. It is desirable that during use the tension in the SMA wires is high enough that the transition temperature of the wires is significantly above ambient temperature. This allows rapid cooling of the wires, which allows rapid actuator motion. However, the tension also needs to be low enough so that the wire is not damaged. In order to keep the tensions between these two constraints, it is desirable that the tension in all the wires is the same.

In the absence of acceleration, and if we ignore other forces on the moving portion, the sum of the resolved forces along any axis of all the wires must be zero. To make the tension in all the wires similar, actuators are typically designed to have a high degree of symmetry in the actuator. As the actuator moves, that symmetry is broken and so at the extremes of stroke, the difference in wire angles means that the tensions in the wires are different. This can lead to imbalance of tensions between the different wires or damage to the wire due to excessive tension.

The problem is particularly significant when an actuator is designed to fit within a small space constraint in one dimension and when that leads to the angle that the wires make to each other being small.

A first approach of the present techniques provides an SMA actuation apparatus comprising: a support structure; a movable element supported on the support structure in a manner allowing movement of the movable element relative to the support structure; and a plurality of SMA actuator wires connected between the support structure and the movable element and arranged such that, on contraction, a first group of one or more of the SMA actuator wires provides a force on the movable element in a first direction and, on contraction, a second group of one or more of the SMA actuator wires provides a force on the movable element in a second direction, wherein: the first and second groups of SMA actuator wires are arranged such that the range of possible motion of the movable element from a rest position in the first direction is greater than the range of possible motion of the movable element from the rest position in the second direction.

In this approach an actuator is provided that can allow the difference in wire tensions at or towards one extreme of the motion to be reduced thereby allowing the actuator to be operated better closer to this extreme of motion. The direction of motion from the centre of motion to this extreme position may be referred to as the principal direction and the plane normal to the principal direction as the principal plane. The range of motion in a particular direction is often referred to in this field as the "stroke".

In certain arrangements the first and second direction are opposite, for example being in opposite directions along the principal direction. This may be useful where, for example, the normal resting position of the movable element is close to one extreme of motion, but it is desired to move the moveable element a relatively long distance to the opposite extreme of motion.

In certain arrangements the first and second directions lie along a principal axis of the apparatus, and the angle between the principal axis and each wire in the first group of SMA actuator wires is smaller than the angle between the principal axis and each wire in the second group of SMA actuator wires. This arrangement of actuator wires can permit the desired range of movement.

In certain arrangements the first and second directions are perpendicular to each other. This may be useful, for example, where two-dimensional movement of the movable element is desired, but the range of movement desired in one dimension is different to that in another dimension.

In certain arrangements, a third group of SMA actuator wires are arranged such that, on contraction, they provide a force on the movable element in a third direction, wherein the first and second directions are opposite and the third direction is orthogonal to the first and second directions, and the groups of SMA actuator wires are arranged such that the ranges of possible motion of the movable element from the rest position in each of said directions are different. This arrangement is a combination of the above arrangements with opposite and orthogonal movement.

A second approach of the present techniques provides an SMA actuation apparatus comprising: a support structure; a movable element supported on the support structure in a manner allowing movement of the movable element relative to the support structure at least along a principal axis of the apparatus; and a plurality of SMA actuator wires connected between the support structure and the movable element and arranged such that when the actuator is at a rest position, the arrangement of SMA actuator wires as viewed from any direction perpendicular to the principal axis is not symmetric about any plane perpendicular to the principal axis.

According to this approach, the actuator can be made so that, at the centre of motion, the SMA actuator wires are not symmetrical. As the movable element moves towards the desired extreme of motion the layout of the wire angles initially become more symmetrical. This can allow the actuator to move further in the principal direction along the principal axis before the tensions in the wires become intolerably dissimilar. In this arrangement, the possible motion along the principal axis can be greater in one direction than in the opposite direction.

In certain arrangements the angle between the principal axis and each wire pulling in a fourth direction along the principal axis is smaller than the angle between the principal axis and each wire pulling in a fifth direction which is opposite to said fourth direction.

A third approach of the present techniques provides an SMA actuation apparatus comprising: a support structure; a movable element supported on the support structure in a manner allowing movement of the movable element relative to the support structure; and a plurality of SMA actuator wires connected between the support structure and the movable element and arranged such that, on contraction, a first group of one or more of the SMA actuator wires provides a force on the movable element in a first direction and, on contraction, a second group of one or more of the SMA actuator wires provides a force on the movable element in a second direction, wherein: the first and second groups of SMA actuator wires are arranged such that when all the wires have the same strain, the average of the angles between each of the wires in the first group and the first direction is smaller than the average of the angles between each of the wires in the second group and the second direction.

According to this approach, the arrangement of SMA actuator wires may not be symmetrical. As the movable element moves towards the desired extreme of motion the layout of the wire angles initially become more symmetrical. This can allow the actuator to move further in the principal direction along the principal axis before the tensions or strains in the wires become too dissimilar. In this arrangement, the possible motion along the principal axis can be greater in one direction than in the opposite direction.

In certain arrangements the first and second directions are opposite, for example being in opposite directions along a principal direction. This may be useful where, for example, the normal resting position of the movable element is close to one extreme of motion, but it is desired to move the moveable element a relatively long distance to the opposite extreme of motion.

In certain arrangements the first and second directions are opposite and lie along a principal axis of the apparatus, and the angle between the principal axis and each wire in the first group of SMA actuator wires is smaller than the angle between the principal axis and each wire in the second group of SMA actuator wires. This arrangement of actuator wires can permit the desired range of movement.

A further approach of the present techniques provides an 8-wire SMA actuator wherein eight SMA wires are connected between a support and a movable element in such a way that four of the wires pull in a first direction along a principal axis and the other four wires pull in the opposite direction along that principal axis, wherein the wires are arranged such that the range of possible motion along the principal axis is greater than the range of possible motion in the plane perpendicular to the principal axis; and wherein the wires are arranged such that the range of motion along the principal axis is greater in the first direction along the principal axis than in the second opposite direction along the principal axis. The angle between the principal axis and each wire pulling in the first direction may be smaller than the angle between the principal axis direction and each wire pulling in the second direction.

The following features are applicable to any of the approaches and arrangements discussed herein, either singly or in combination.

The actuation apparatus may be an eight-wire actuator such as that in WO2011/104518 which may be used to move a camera lens element in a camera. In such a case the principal direction may be along the optical axis of the lens element.

For example, there may be eight SMA actuator wires inclined with respect to a principal axis of the apparatus, with two SMA actuator wires on each of four sides around the principal axis, the SMA actuator wires being connected such that on contraction two groups of four SMA actuator wires provide a force on the movable element with a component in opposite directions along the principal axis, the SMA actuator wires of each group being arranged with two-fold rotational symmetry about the principal axis.

The SMA actuation apparatus may further include a bearing which is arranged to guide the motion of the movable element. The use of a bearing can reduce the range of motion of the movable element which needs to be provided by the SMA actuator wires and thus simplify the apparatus.

The rest position of the movable element may be the natural rest position of the movable element when no force is deliberately applied to the movable element. In practice, the movable element is likely to be subject to at least an external gravitational force and so such a rest position may include the natural rest position or positions of the movable element in arrangements where the only active force that it is subject to is a gravitational force, e.g. with all other forces being a reactive force countering the gravitational force.

In certain arrangements, the rest position may be the position in which all of the SMA actuator wires have equal strain. Alternatively or additionally the rest position may be the position which the movable element adopts if an equal power is applied to each of the SMA actuator wires (which may include no power being applied to each of the wires). It will be appreciated that variations in manufacture of the SMA actuator wires and/or their connection to the support structure and/or movable element may cause slight variations in these positions and "equal" in this context is to be understood as encompassing such minor variations.

In certain arrangements, the rest position is the centre of the three-dimensional range of motion of the movable element. As the range of motion is at least partly asymmetric, "centre" in this context means the position along any given axis where the total range of motion along at least one axis orthogonal to that axis is at its maximum, and preferably where the total range of motion along all axes orthogonal to that axis is at its maximum.

In certain arrangements, the rest position may be the position that the movable element is in immediately following manufacture of the actuator. In other arrangements, the rest position may be set by calibration of the actuator prior to use. Such calibration may include, for example, the adjustment of the power applied to any of the actuator wires in order to set the rest position.

In certain arrangements the SMA actuation apparatus is a camera apparatus and further comprises an image sensor fixed to the support structure, wherein the movable element comprises a lens element arranged to focus an image on the image sensor.

The actuation apparatus may further comprise a control circuit electrically connected to the SMA actuator wires and arranged to provide drive signals to the SMA actuator wires.

For example the control circuit may be arranged to generate the drive signals in order to focus the image on the image sensor and the SMA actuator wires may be arranged such that the range of possible motion of the movable element along an optical axis of the lens element away from the image sensor is greater than the range of possible motion of the movable element along the optical axis towards the image sensor. This arrangement may be useful where the motion of the movable element is being used for an autofocus function, where the rest position is close to the image sensor and is the infinity focus position, and movement away from the image sensor allows focusing of images closer to the camera apparatus.

The apparatus may further comprise a vibration sensor arranged to generate output signals representative of the vibration of the apparatus, the control circuit being arranged to generate the drive signals in response to the output signals in order to stablise the image sensed by the image sensor.

The SMA actuator wires may be arranged such that the range of possible motion of the movable element in a direction perpendicular to an optical axis of the lens element is greater than the range of possible motion of the movable element along the optical axis. Generally in a camera device which provides for both image stabilisation and focusing by movement of a lens element, the range of movement required for stabilisation is less than that required for focusing.

In certain arrangements of the above approaches, when the actuator is positioned such that the angles that the wires make to the principal plane (or principal axis) are similar, then the strain of the SMA actuator wires (how stretched they are form an un-loaded fully austenitic length) that have a component that pull the movable element in a first direction (e.g. along the principal axis) will be less than that of the wires that pull the movable element in a second direction (e.g. in the opposite sense along the principal axis). In other arrangements, the lengths and/or angles of the SMA actuator wires are asymmetric when the movable element is at a rest position.

The present techniques may in general be applied to any type of device that comprises a static part and a moveable part which is moveable with respect to the static part. By way of non-limitative example, the actuator assembly may be, or may be provided in, any one of the following devices: a smartphone, a camera, a foldable smartphone, a foldable smartphone camera, a foldable consumer electronics device, an image capture device, a foldable image capture device, an array camera, a 3D sensing device or system, a servomotor, a consumer electronic device (including domestic appliances), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), a security system, a gaming system, a gaming accessory (e.g. controller, headset, a wearable controller, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle. It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

Embodiments of the present techniques will now be described by way of example with reference to the accompanying figures in which.

Figure 1:
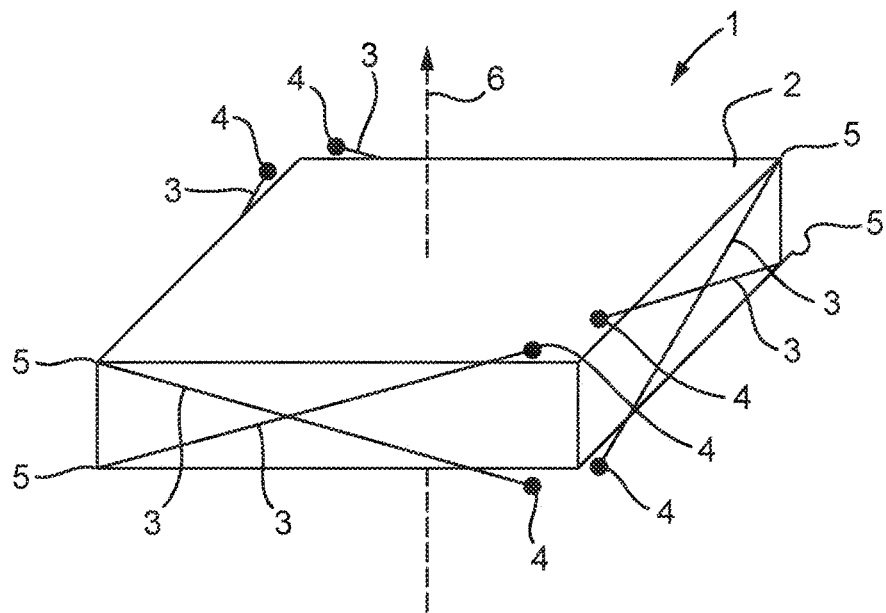
FIG. 1 shows a wire arrangement of a regular 8-wire SMA actuator.

FIG. 1 shows the wire arrangement in an 8-wire actuator as described in WO2011/104518 at the centre of motion. The actuator 1 comprises a moving element 2 and eight SMA wires 3 (of which six are visible in the figure). Each SMA wire 3 is attached at one end 4, denoted by a circle, to the static part (the support, not shown for clarity). At the other end 5 of each wire 3, it is attached to the moving element 2. The principal direction 6 is also shown. The moving element 2 may for example be, or carry, a lens element in which case the principal axis 6 is the optical axis and movement along the optical axis provides autofocus (AF) while movement in the plane perpendicular to the optical axis provides optical image stabilization (OIS).

Figure 2:
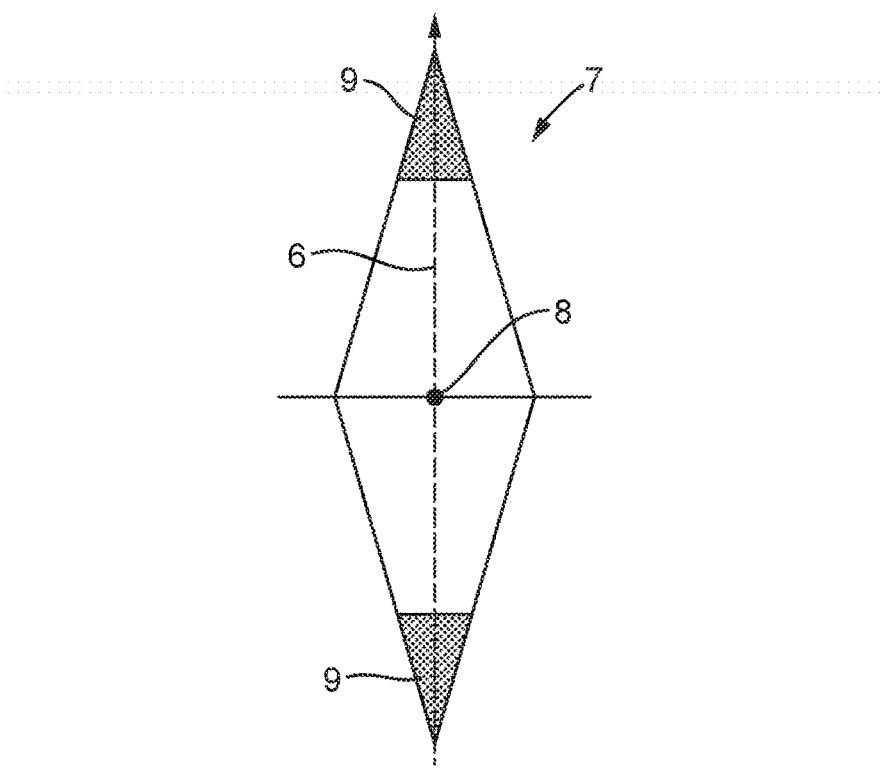
FIG. 2 is a schematic illustration of the range of motion of the actuator shown in FIG. 1.

FIG. 2 shows a cross section of the octahedron of motion 7 for the arrangement shown in FIG. 1, with the centre of motion 8 marked. Two regions 9 are marked where the difference in tension between the wires that pull the moving portion up and the wires that pull the moving portion down is sufficiently high that good performance is not possible.

Figure 3:
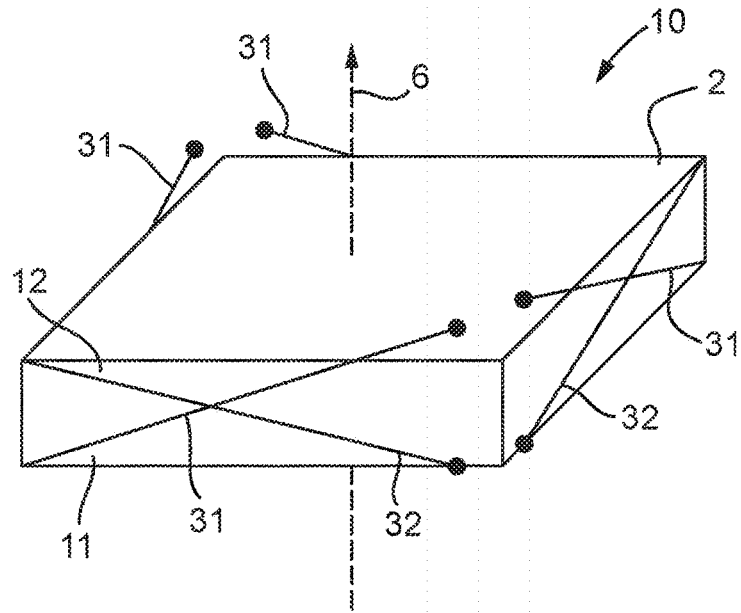
FIG. 3 shows an SMA actuator according to an embodiment of the present techniques.

FIG. 3 shows an 8-wire actuator 10 of an embodiment of the present techniques at its centre of motion. In this figure the wires which move the movable element 2 upwards are labelled 31 and those which move the movable element 2 down are labelled 32 (there are four of each, not all visible). The principal plane is the plane perpendicular to the principal axis 6, and in FIG. 3 the upper and lower surfaces of the movable element 2 are shown parallel to this plane. In the actuator of this embodiment, the angle 11 between the principal plane and the wires 31 that pull the moving portion upwards is larger than the angle 12 between the principal plane and the wires 32 that pull the moving portion downwards.

Figure 4:
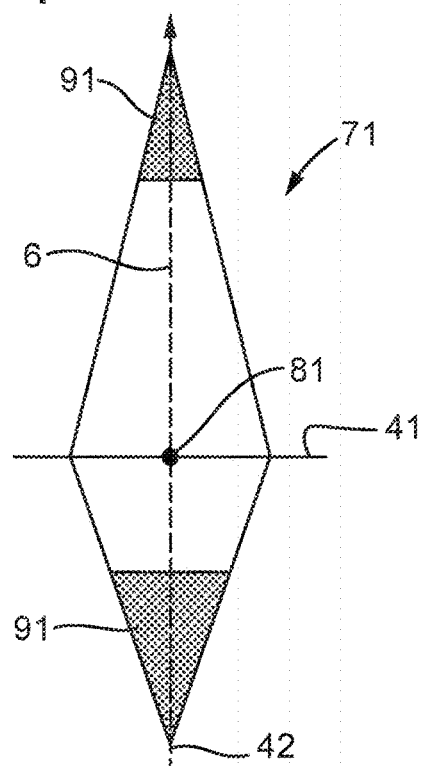
FIG. 4 is a schematic illustration of the range of motion of the actuator shown in FIG. 3.

FIG. 4 shows a cross section 71 of the octahedron of motion for the arrangement shown in FIG. 2, with the centre of motion 81 marked. Two regions 91 are marked where the difference in tension between the wires that pull the moving portion up and the tension that pull the moving portion down is sufficiently high that good performance is not possible.

In the arrangement according to an embodiment of the present techniques, as shown in FIGS. 3 and 4, it can be seen that the maximum motion in a direction normal to the principal axis, denoted by line 41, is closer to the bottom 42 of the range of motion along the principal axis 6. It can also be seen that the maximum motion in a direction normal to the principal axis is less than the maximum motion in a direction along the principal axis.

Such an asymmetric 3-D actuator is of particular use in applications where it is desired to have more motion in a first dimension than in second and third dimensions, and also where the motion in that first dimension is desired to be greater in one direction than in its opposite direction relative to the point of maximum stroke in the second and third dimensions.

This is useful for example in a miniature camera such as used in mobile phones, where the SMA actuator serves to provide Autofocus (AF) and Optical Image Stabilization (OIS). In this case the movable element is or carries the lens element of the camera, the principal direction is the optical axis of the lens element and the principal plane is perpendicular to this. If the optical axis is labelled the z direction, then the x-y plane is perpendicular to it and movement in this plane provides OIS. The amplitude of motion needed for OIS is considerably less than the amplitude of motion required for AF along the optical axis. The x-y excursion may by about 80 microns while the range of z motion is required to be 300 microns.

In the camera application, at rest the lens element is close to the image sensor, providing infinity focusing. In use, the lens is moved along the optical axis in the direction away from the image sensor in the positive z direction, in order to bring near scenes into focus. The majority of images are taken when the optical element is close to the image sensor and, so it is desirable that the maximum x-y excursion when the optical element is in this position. It is not required for the lens to move from this position in the negative z direction. It is therefore advantageous to have an actuator with asymmetric stroke in the z direction, since by doing so it increases the available +z stroke.

A first example of the present techniques is as follows. An 8-wire SMA actuator is provided in order to move the lens in a mobile phone camera to facilitate AF by moving the lens along the optical axis of the lens and to facilitate OIS by moving the lens in the plane perpendicular to the optical axis. The actuator is 8.5 mm×8.5 mm and has a height of 2.5 mm. The lens element is the movable element and the optical axis of the lens element is the principal axis.

In a symmetrical design of an 8-wire SMA actuator, at the centre of motion the wires make an angle of 12 degrees to the plane of the OIS motion (the principal plane). The length of the wires between the points where the wires are attached to the moving portion and the static portion is 6.12 mm.

When the lens is moved 200 μm from the centre of motion along the optical axis, then the wires that pull the lens in that direction (pulling wires), make an angle of 10.16 degrees to the plane of OIS motion while the wires that pull the actuator back towards the centre of motion (return wires) make an angle of 13.82 degrees to the plane of OIS motion. If we ignore the effect of gravity and any springs in the system on the wire tensions, then the pulling wires will have a tension that is 35% higher than the return wires. This difference in tension means that if the tension in the pulling wires is not allowed to increase to prevent damage to the wires, then the return wires will have a tension that is 35% lower. This means that the transition temperature of these wires will be reduced which will significantly reduce the rate at which these wires are able to cool and consequently the speed at which the lens can be moved.

According to the present techniques the symmetry of the actuator is changed at the centre of motion or conversely the centre of motion is moved away from the position where all the wires have the same angle to the plain of the OIS motion.

One example of a non-symmetrical design according to the present techniques, based on the above example is as follows. At the centre of motion, the pulling wires make an angle of 13 degrees to the plane of OIS motion and the return wires make an angle of 11 degrees to the plane of OIS motion. The length of both sets of wires as projected onto the plane of OIS motion is the same, but due to the difference in wire angle the length of the pulling wires is 6.140 mm while the length of the return wires is 6.095 mm.

When the lens is moved 109 μm from the centre of motion along the optical axis in the direction pulled by the pulling wires, then the angle that the pulling wires make to the plane of OIS motion is reduced to 12 degrees and the angle that the return wires make to the plane of OIS motion is increased to 12 degrees.

When the lens is moved 200 μm from the centre of motion, along the optical axis in the direction pulled by the pulling wires, then the angle that the pulling wires make to the plane of OIS motion is 11.2 degrees and the angle that the return wires make to the plane of OIS motion is 12.8 degrees. If we ignore the effect of gravity and any springs in the system on the wire tensions, then the pulling wires will have a tension that is only 15% higher than the return wires. This is a much smaller difference in tension than the 35% observed in the symmetrical design and allows more controllable motion.

Whilst embodiments and examples of the present techniques have been explained with reference to an actuation apparatus having eight SMA actuator wires, the skilled person will appreciate that the principles are equally applicable to actuation apparatuses having different numbers of actuator wires and/or different arrangements of actuator wires. In particular, the principles are applicable to arrangements having four actuator wires and arrangements in which the movable element is supported by a bearing which guides the motion of the movable element, for example to guide the motion of the movable element along the principal axis.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A shape memory alloy (SMA) actuation apparatus, comprising:
 a support structure;
 a movable element supported on the support structure in a manner allowing movement of the movable element relative to the support structure; and
 a plurality of SMA actuator wires connected between the support structure and the movable element and arranged such that:

on contraction, a first group of one or more of the SMA actuator wires provides a force on the movable element in a first direction;

on contraction, a second group of one or more of the SMA actuator wires provides a force on the movable element in a second direction;

on contraction, a third group of the SMA actuator wires provides a force on the movable element in a third direction, wherein:

the first and second directions are opposite and lie along a principal axis of the apparatus;

the third direction is orthogonal to the first and second directions;

the groups of SMA actuator wires are arranged such that the ranges of possible motion of the movable element from a rest position in each of said directions are different; and the first and second groups of SMA actuator wires are arranged such that the range of possible motion of the movable element from the rest position in the first direction is greater than the range of possible motion of the movable element from the rest position in the second direction.

2. The SMA actuation apparatus according to claim 1, wherein the angle between the principal axis and each wire in the first group of SMA actuator wires is smaller than the angle between the principal axis and each wire in the second group of SMA actuator wires.

3. The SMA actuation apparatus according to claim 1, further including a bearing which is arranged to guide the motion of the movable element.

4. A shape memory alloy (SMA) actuation apparatus comprising:

a support structure;

a movable element supported on the support structure in a manner allowing movement of the movable element relative to the support structure; and a plurality of SMA actuator wires connected between the support structure and the movable element and arranged such that, on contraction, a first group of one or more of the SMA actuator wires provides a force on the movable element in a first direction and, on contraction, a second group of one or more of the SMA actuator wires provides a force on the movable element in a second direction, wherein:

the first and second groups of SMA actuator wires are arranged such that when all the wires have the same strain, the average of the angles between each of the wires in the first group and the first direction is smaller than the average of the angles between each of the wires in the second group and the second direction.

5. The SMA actuation apparatus according to claim 4, wherein the first and second directions are opposite.

6. The SMA actuation apparatus according to claim 5, wherein the first and second directions lie along a principal axis of the apparatus, and the angle between the principal axis and each wire in the first group of SMA actuator wires is smaller than the angle between the principal axis and each wire in the second group of SMA actuator wires.

7. A shape memory alloy (SMA) actuation apparatus, comprising:

a support structure;

a movable element supported on the support structure in a manner allowing movement of the movable element relative to the support structure; and a plurality of SMA actuator wires connected between the support structure and the movable element, the SMA actuator wires comprising eight SMA actuator wires inclined with respect to a principal axis of the apparatus, with two SMA actuator wires on each of four sides around the principal axis, wherein:

the SMA actuator wires is connected such that on contraction two groups of four SMA actuator wires provide a force on the movable element with a component in opposite directions along the principal axis, the SMA actuator wires of each group being arranged with two-fold rotational symmetry about the principal axis; and the two groups of SMA actuator wires are arranged such that the range of possible motion of the movable element from a rest position in a first direction is greater than the range of possible motion of the movable element from the rest position in an opposite second direction.

8. The SMA actuation apparatus according to claim 7, wherein the angle between the principal axis and each wire in one of the two groups of SMA actuator wires is smaller than the angle between the principal axis and each wire in the other of the two groups of SMA actuator wires.

9. The SMA actuation apparatus according to claim 7, further including a bearing which is arranged to guide the motion of the movable element.

10. A camera apparatus, comprising:

a support structure;

an image sensor fixed to the support structure, a movable element supported on the support structure in a manner allowing movement of the movable element relative to the support structure, the movable element comprising a lens element arranged to focus an image on the image sensor;

a plurality of shape memory alloy (SMA) actuator wires connected between the support structure and the movable element and arranged such that, on contraction, a first group of one or more of the SMA actuator wires provides a force on the movable element in a first direction and, on contraction, a second group of one or more of the SMA actuator wires provides a force on the movable element in a second direction, wherein:

the first and second directions are opposite and lie along a principal axis of the apparatus; and the first and second groups of SMA actuator wires are arranged such that the range of possible motion of the movable element from a rest position in the first direction is greater than the range of possible motion of the movable element from the rest position in the second direction; and a control circuit electrically connected to the SMA actuator wires and arranged to provide drive signals to the SMA actuator wires, wherein the control circuit is arranged to generate the drive signals in order to focus the image on the image sensor and wherein the SMA actuator wires are arranged such that the range of possible motion of the movable element along an optical axis of the lens element away from the image sensor is greater than the range of possible motion of the movable element along the optical axis towards the image sensor.

11. The camera apparatus according to claim 10, wherein the camera apparatus is or is provided in any one of: a smartphone, a camera, a foldable smartphone, a foldable smartphone camera, a foldable consumer electronics device, an image capture device, a foldable image capture device, an array camera, a 3D sensing device or system, a servomotor, a consumer electronic device, a mobile or portable computing device, a mobile or portable electronic device, a laptop, a tablet computing device, an e-reader, a computing accessory or computing peripheral device, a security system, a gaming system, a gaming accessory, a robot or robotics device, a medical device, an augmented reality system, an augmented reality device, a virtual reality system, a virtual reality device, a wearable device, a drone, an aircraft, a spacecraft, a submersible vessel, a vehicle, and an autonomous vehicle.

12. The camera apparatus according to claim 10, wherein the angle between the principal axis and each wire in the first group of SMA actuator wires is smaller than the angle between the principal axis and each wire in the second group of SMA actuator wires.

13. The camera apparatus according to claim 10, further including a bearing which is arranged to guide the motion of the movable element.

14. A camera apparatus comprising:
a support structure;
an image sensor fixed to the support structure,
a movable element supported on the support structure in a manner allowing movement of the movable element relative to the support structure, the movable element comprising a lens element arranged to focus an image on the image sensor;
a plurality of shape memory alloy (SMA) actuator wires connected between the support structure and the movable element and arranged such that, on contraction, a first group of one or more of the SMA actuator wires provides a force on the movable element in a first direction and, on contraction, a second group of one or more of the SMA actuator wires provides a force on the movable element in a second direction, wherein:
the first and second directions are opposite and lie along a principal axis of the apparatus;
the first and second groups of SMA actuator wires are arranged such that the range of possible motion of the movable element from a rest position in the first direction is greater than the range of possible motion of the movable element from the rest position in the second direction; and
the SMA actuator wires are arranged such that the range of possible motion of the movable element in a direction perpendicular to an optical axis of the lens element is greater than the range of possible motion of the movable element along the optical axis;
a vibration sensor arranged to generate output signals representative of the vibration of the apparatus; and
a control circuit electrically connected to the SMA actuator wires and arranged to provide drive signals to the SMA actuator wires, the control circuit being arranged to generate the drive signals in response to the output signals in order to stabilise the image sensed by the image sensor.

15. The camera apparatus according to claim 14, wherein the camera apparatus is or is provided in any one of: a smartphone, a camera, a foldable smartphone, a foldable smartphone camera, a foldable consumer electronics device, an image capture device, a foldable image capture device, an array camera, a 3D sensing device or system, a servomotor, a consumer electronic device, a mobile or portable computing device, a mobile or portable electronic device, a laptop, a tablet computing device, an e-reader, a computing accessory or computing peripheral device, a security system, a gaming system, a gaming accessory, a robot or robotics device, a medical device, an augmented reality system, an augmented reality device, a virtual reality system, a virtual reality device, a wearable device, a drone, an aircraft, a spacecraft, a submersible vessel, a vehicle, and an autonomous vehicle.

16. The camera apparatus according to claim 14, wherein the angle between the principal axis and each wire in the first group of SMA actuator wires is smaller than the angle between the principal axis and each wire in the second group of SMA actuator wires.

17. The camera apparatus according to claim 14, further including a bearing which is arranged to guide the motion of the movable element.

* * * * *